(12) United States Patent
Gagne (10) Patent No.: US 8,167,650 B2
(45) Date of Patent: May 1, 2012

(54) FORMED GASKET FOR AN ELECTRONIC CONNECTOR

(75) Inventor: Andre Joseph Claude Gagne, Milton (CA)

(73) Assignee: Psion Teklogix Inc., Mississauga (CA)

( * ) Notice: Subject to any disclaimer, the term of this patent is extended or adjusted under 35 U.S.C. 154(b) by 56 days.

(21) Appl. No.: 12/841,214

(22) Filed: Jul. 22, 2010

(65) Prior Publication Data

US 2012/0021630 A1    Jan. 26, 2012

(51) Int. Cl.
*H01R 13/58* (2006.01)
(52) U.S. Cl. .......................... 439/606; 439/271; 29/883
(58) Field of Classification Search .................. 439/606, 439/271–283; 29/874, 883, 885, 876, 858
See application file for complete search history.

(56) References Cited

U.S. PATENT DOCUMENTS

| 5,823,811 | A * | 10/1998 | Blanchfield et al. | 439/274 |
| 6,482,021 | B2 * | 11/2002 | Hara et al. | 439/279 |
| 6,602,088 | B1 * | 8/2003 | Zhu | 439/382 |
| 2005/0009394 | A1 * | 1/2005 | Kameyama et al. | 439/274 |

* cited by examiner

*Primary Examiner* — Ross Gushi
(74) *Attorney, Agent, or Firm* — Grant Tisdall; Gowling Lafleur Henderson LLP

(57) ABSTRACT

Described is an electronic connector. The electronic connector has a substrate body for housing electronic pins and a cable. The substrate body is fabricated from a first material, such as hard plastic and has at least one passage from its exterior to its interior. The overmold is fabricated from a resilient material having a lower melting point than the first material. The resilient material is overmolded onto the substrate body and flows through the at least one passage in the substrate body and forms a gasket on the connecting surface of the substrate body.

18 Claims, 9 Drawing Sheets

FORMED GASKET FOR AN ELECTRONIC CONNECTOR

FIELD OF THE INVENTION

This invention relates to connector gaskets and in particular to gaskets for electronic connectors.

BACKGROUND OF THE INVENTION

Circuit protective conductor (CPC) style connectors are commonly provided as packages of parts that are then assembled into electronic connectors. This assembly can be time consuming, labour intensive and costly.

These types of CPC-style connector assemblies may be prone to the risk of water ingress, thus possibly damaging electrical equipment and causing performance degradation. For example, the gaskets may wear out or may not be installed correctly. Further, it can be expensive to manufacture and assemble connectors that have many different pieces required for their assembly.

The present invention addresses at least one of the above problems.

SUMMARY OF THE INVENTION

It is known that CPC-style connector assemblies may be prone to the risk of water ingress, thus possibly damaging electrical equipment and causing performance degradation. For example, the gaskets may wear out or may not be installed correctly. Further, it can be expensive to manufacture and assemble connectors that have many different pieces required for their assembly. Contrary to current connectors there is provided a connector, comprising: a substrate body having an exterior surface, a connecting surface at a connector end of the body for connecting to a second connector, and at least one passage in the body fluidly connecting the connecting surface and the exterior surface; and a resilient material portion molded on the external surface of the substrate body as a resilient body portion, as a connecting portion in the at least one passageway, and as a sealing gasket portion on the connecting surface, such that the sealing gasket portion is integral with the connecting portion and with the resilient body, wherein the melting point of the resilient material is lower than the melting point of the substrate body.

A first aspect provided is a connector, comprising: a substrate body having an exterior surface, a connecting surface at a connector end of the body for connecting to a second connector, and at least one passage in the body fluidly connecting the connecting surface and the exterior surface; and a resilient material portion molded on the external surface of the substrate body as a resilient body portion, as a connecting portion in the at least one passageway, and as a sealing gasket portion on the connecting surface, such that the sealing gasket portion is integral with the connecting portion and with the resilient body, wherein the melting point of the resilient material is lower than the melting point of the substrate body.

A second aspect provided is a method of making a connector, comprising: providing a substrate body in a mould, the substrate body having an exterior surface, a connecting surface at a connector end of the body for connecting to a second connector, and at least one passage in the body fluidly connecting the connecting surface and the exterior surface; and moulding resilient material in the mold onto the substrate body to form a resilient material portion on the external surface of the substrate body as a resilient body portion, a connecting portion in the at least one passageway and a sealing gasket portion on the connecting surface, such that the sealing gasket portion is integral with the connecting portion and with the resilient body portion.

A third aspect provided is an electronic connector, comprising: an electronic cable; a substrate body having an interior for housing the electronic cable and an exterior surface, a connecting surface at a connector end of the body for connecting to a second connector, and at least one passage in the body fluidly connecting the connecting surface and the exterior surface; and a resilient material portion moulded on the external surface of the substrate body as a resilient body portion, as a connecting portion in the at least one passageway, and as a sealing gasket portion on the connecting surface, such that the sealing gasket portion is integral with the connecting portion and with the resilient body.

BRIEF DESCRIPTION OF THE DRAWINGS

In order that the subject matter may be readily understood, embodiments are illustrated by way of examples in the accompanying drawings, in which.

DETAILED DESCRIPTION

For convenience, like numerals in the description refer to like structures in the drawings.

Disclosed is an overmold connector fabricated by overmolding a resilient material onto a substrate body. The substrate body is designed with at least one passageway between its exterior surface and its connecting surface. This allows the resilient material to pass through the passageway onto the connecting surface during the overmolding process. A mold is used to form a sealing gasket out of the resilient material that is adjacent the connecting surface.

The sealing gasket provides a seal between the overmold connector and a second connector when the two connectors are attached together. Thus, a separate gasket component is not required.

Connectors

Connectors are commonly used for providing power input or output to a wide variety of devices, for proving the transfer of fluids (e.g. water, oil, gas, etc.) to or from a mechanisms, or for otherwise proving a connection between a pair of mediums (e.g. conduits) through which a substance is transmitted. In terms of power transmission, the connection can be embodied as an industrial power input/output connector used to connect two cables together or a cable to a power source. For example, electronic connectors may be used to connect outdoor machinery (such as a pump or an industrial cleaner) to a power source. In general, the connectors may have complimentary connectors, a first being able to connect to a second, with each connector housing electronic components, such as wires and/or a cable. For example, the first connector may house electronic pins and the second connector may house electronic sockets which are configured to receive the electronic pins, or the first connector may house electronic sockets and the second connector may house electronic pins which are configured to be received by the electronic sockets.

Electronic connectors may be molded over cables and house the electronic pins or the electronic sockets of the cables. Cables typically hold electronic wires. The pins may be made by crimping a stamped and formed contact to the end of the electronic wire on which the substrate body is formed. Thus when a first connector is attached to a second connector, the cable housed by the first connector is connected (i.e. so that the pins are connected to the sockets allowing electricity to pass through) to the second connector.

Although circular connectors may be a more efficient use of space, the shape of the connectors does not necessarily have to be circular. For example, the shape of the connectors may be rectangular.

Circular Plastic Connectors (CPCs) are one example of electronic connectors. The present will be described with reference to CPCs, however it is understood that the present invention can be implements with other types of connectors (e.g. fluid transfer) of different shapes (e.g. square, rectangular).

Resilient Gasket

A gasket is a resilient mechanical seal that fills the space between two mating surfaces, so as to inhibit leakage into or out of the joined objects while the two mating surfaces of the connector are compressed towards each other. For example, gaskets may be used to inhibit water from interfering with an electronic connection (e.g. contaminating or otherwise shorting out the connection between the pins and sockets). The resilient gaskets can provide a continuous peripheral seal around the connection (e.g. electronic), so as to inhibit the infiltration of water/moisture (or other contaminants of the connection) from outside of the connector into the connection. The resilient gaskets may be used between mating surfaces that are not perfectly mated in order to fill in irregularities of the mating/connection surfaces.

Gaskets are sealing portions positioned in between the two mating/connecting surfaces of the connection. The gaskets may be produced using materials such as but not limited to: rubber, silicone, elastomer, plastic polymer, or other moldable materials such as a material suitable for overmoulding. It is desirable that the gasket be made from a material that is to some degree yielding/resilient such that it is able to deform and tightly fill the space it is designed for, including any slight irregularities, so as to provide for a peripheral seal around the connection for inhibiting infiltration of contaminant(s).

Figure 1A:
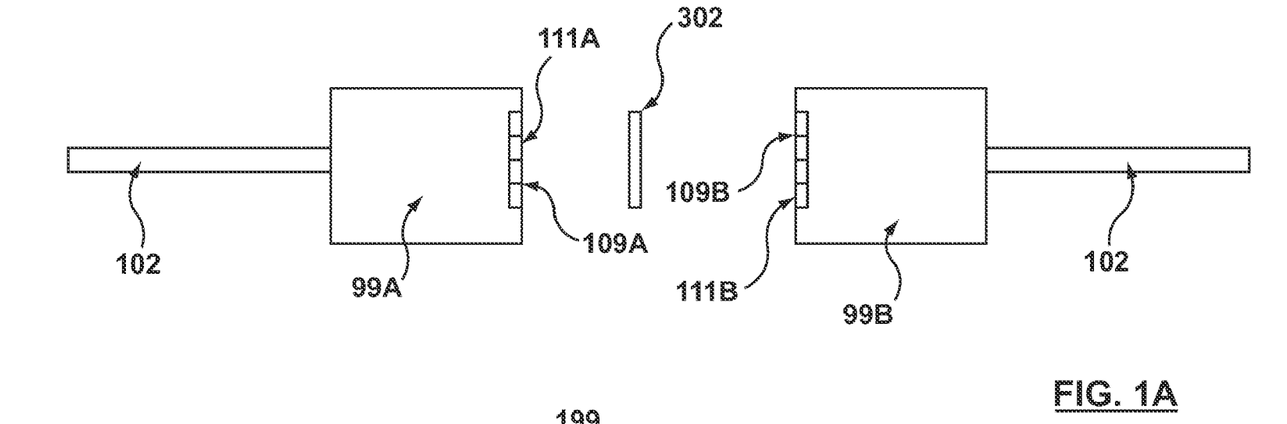
FIG. 1A is a block diagram showing two electronic connectors and a gasket.
Figure 1B:
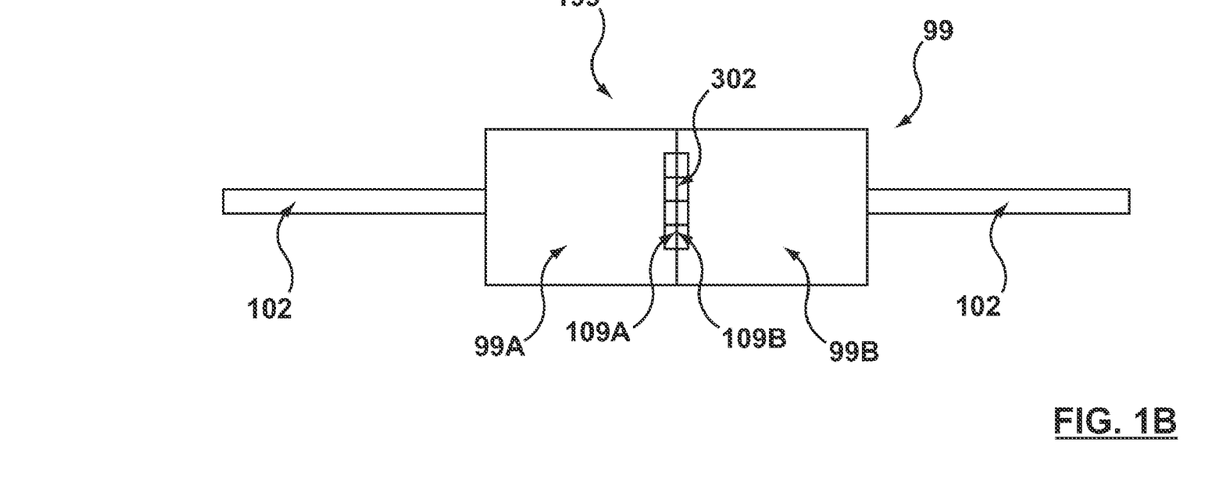
FIG. 1B is a block diagram showing two electronic connectors connected together.

FIGS. 1A and 1B show a first connector 99A and a second connector 99B joined together (FIG. 1B) to form a connection 199 (e.g. electronic). The electronic connection 199 may have a first connector 99A with a connecting/mating surface 111A. The electronic connection 199 may also have a second connector 99B with a connecting/mating surface 111B. The connecting surface 111A can mate with the connecting surface 111B so that electricity (or other transferred material) can flow across the connecting surfaces 111A, 111B. The connectors 99A, 99B may house electrical components for connecting to one another. For example, electronic pins 109A may be housed in the first connector 99A and sockets 109B for receiving the electronic pins 109A may be housed in the second connector 99B. When the two connectors 99A, 99B are joined together the electrical components housed in the two connectors 99A, 99B are connected so that electricity can flow therethrough.

The gasket 302 is shown as a component for positioning via a moulding process on either of the surfaces 111A, 111B. The gasket 302 may be positioned/formed at least partially between the connecting surfaces 111A, 111B to assist in forming a seal to inhibit water, dirt or other fluids from interfering with the connection between the electronic components housed in the connectors 99A, 99B. The gasket 302, for example, resides (either adjacent to but not bonded, or adjacent to and bonded to the respective surface 111A, B) on one of the surfaces 111A, B for subsequent positioning between the connecting surfaces 111A, 111B, when the two connectors 99A, 99B are joined together to make the connection 199. The gasket 302 provides the peripheral seal (e.g. an annular ring) surrounding the area where the electronic components housed in the connectors 99A, 99B may be connected between the surfaces 111A, B. When the two connecting surfaces 111A, 111B are connected, the two connectors 99A, 99B may be joined together into a single connected component 99, with the resilient gasket 302 positioned on one of the surfaces 111A, B forming the seal between the mating surfaces 111A, 111B.

Accordingly, it is recognised that the connecting surface 111 hosting the gasket sealing portion 302 can be positioned on a female type connector 99 configured for mating with a corresponding connecting surface 111 of a male type connector 99 to establish an impervious seal between the female and male connectors 99 between their adjacently positioned connecting surfaces 111, once connected together to form the connection.

Alternatively, it is recognised that the connecting surface 111 hosting the gasket sealing portion 302 can be positioned on a male type connector 99 configured for mating with a corresponding connecting surface 111 of a female type connector 99 to establish an impervious seal between the female and male connectors 99 between their adjacently positioned connecting surfaces 111, once connected together to form the connection.

Other arrangements of the connection can, for example, two male connectors such that one of the connectors 99 has the gasket 302 hosted on it's corresponding connecting surface 111.

Overmolding

Overmolding is any molding process where two or more materials, such as molten plastics or polymers/elastomers, are moulded onto a substrate to produce a single part. A rigid plastic substrate body can be combined with a resilient or rubber-like elastomer as the moulded material (e.g. overmould material) applied to the underlying substrate. The elastomer may be a thermoplastic elastomer which may be molded on top of the substrate body, for example. Overmolding allows these two or more different materials to be combined into one part to improve appearance or durability. The substrate body is first molded and hardened, and then the resilient material is molded onto the hardened substrate body.

Insert molding is one type of overmolding process. Insert molding involves first placing one or more substrate bodies in a mold, either by hand or automatically; second, a molten polymer (which hardens upon curing/cooling as a resilient material) is injected into the cavity of the same mold. When the polymer is hardened over the substrate, the overmolding is complete.

Multi-shot molding is another form of overmolding. In the multi-shot molding process, multiple injection units are each independently used to inject molten polymer into mold in order to form a multi-component assembly.

During the overmolding process the overmolded part (i.e. the injected molten polymer(s), which later hardens) is often bonded to the substrate body. This bond may be a chemical adhesion between compatible polymers or a mechanical interference/interlocking mechanism, for example. If the insert molding process is used, a chemical adhesive can be applied to the inserted substrate body prior to the inserting the substrate body into the mold and/or prior to the injection of the molten polymer. It is recognised that the moulding process can result in the injected molten material becoming bonded to the underlying substrate (e.g. due to partial melting of the underlying substrate by the heat contained in the molten polymeric/elastomeric material, and/or due to the use of an intermediate adhesive material applied to the substrate to facilitate bonding of the polymeric/elastomeric material to the underlying substrate). It is also recognised that the moulding process can result in the injected molten material not becoming bonded to the underlying substrate, i.e. the substrate and the hardened/cured resilient material can be moved relative to one another at their material interface (i.e. the interface surface between the hardened/cured resilient material and the underlying substrate).

It is recognised that the resilient material (e.g. sealing gasket portion 302, an interconnecting portion, and/or an exterior body portion of the resilient material 402) can be of a selected material having a moulding temperature similar to that of the substrate body 100 to maximize adhesion of the resilient material to the substrate body 100. Alternatively, it is recognised that the resilient material (e.g. sealing gasket portion 302, an interconnecting portion, and/or an exterior body portion of the resilient material 402) can be of a selected material having an appropriate moulding temperature dissimilar to that of the substrate body 100 to produce the desired level of adhesion of the resilient material to the substrate body 100.

Electronic Connector 99

Figure 2:
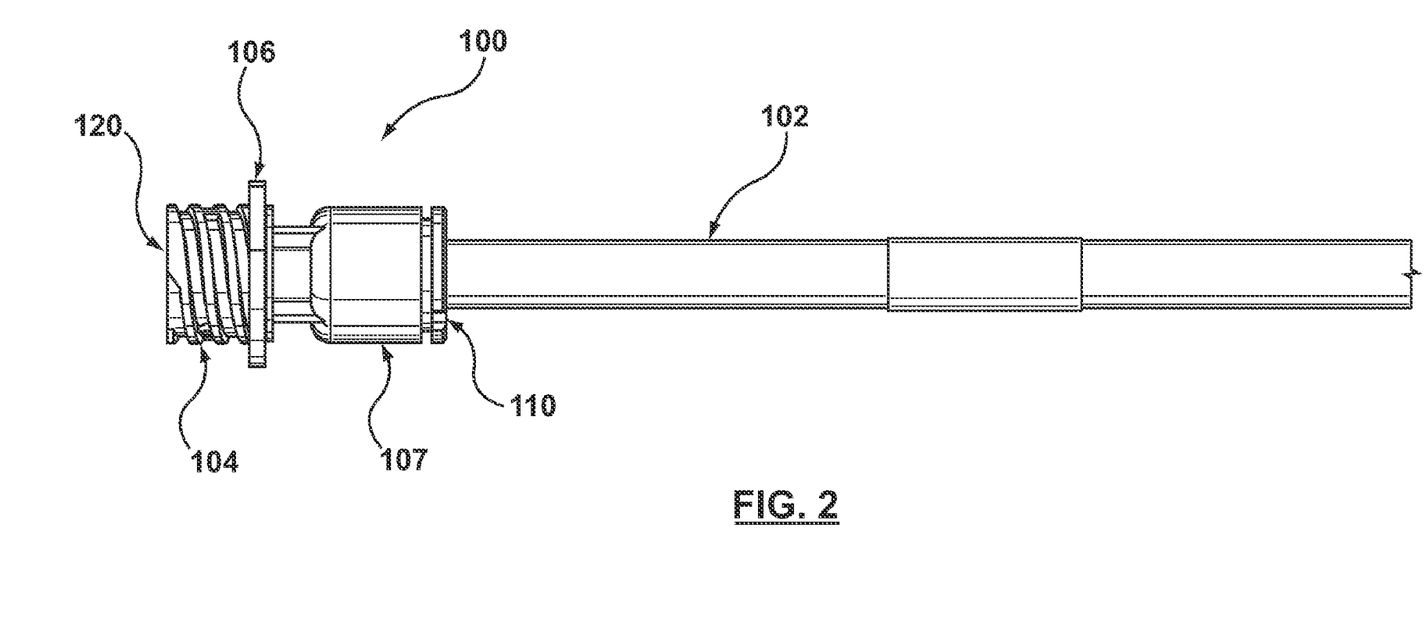
FIG. 2 is a side view of the substrate body of an overmould connector attached to a cable.

FIG. 2 shows a substrate body 100 of the connector 99 and an electronic cable 102. The substrate body 100 may be fabricated from a first material using a conventional mold shape. For example, the first material may be hard plastic which is melted and molded into the substrate body 100. The substrate body 100 has a connecting end 120 opposite a cable end 110 and defines an interior for housing the electronic cable 102. A connecting surface 111 may be in the interior of the substrate body 100 (see FIG. 3). The cable 102 may comprise electronic wires surrounded by a rubber exterior. The electronic wires can extend from each end of the cable 102. The wires are formed into electronic pins at the end thereof which extend into the cable end 110 of the substrate body 100. The connecting/mating end 120 is for securing the electronic connector 99 to a second connector so that the connecting surface 111 is compressed against a corresponding connecting/mating surface of the second connector. The sealing gasket portion 302 (see FIG. 4 described below) is positioned on the connecting surface 11 for ultimate positioning between the two connecting surfaces 111 when the connection is made between the connector 99 and the other connector (not shown). Once the two connectors are connected electricity may pass between the electronic pins extending from the cable 102 housed in the electronic connector 99 and the receiving sockets housed in the second connector. It is recognized that other types of electronic components or connectors may be housed in an electronic connector 99.

The cable end 110 of the substrate body 100 may define separate internal passageways 1, 2, 3, 4 (see FIG. 3), with each passageway configured to allow an electronic pin to pass there through (or to house an electrical socket for ultimate connection to the electrical pins of the other connector when mated to the connector 99). The cable end 110 may be adhered (e.g. chemically) to the rubber or plastic coating on the cable 102 so that the electronic pins extending from the coating pass through the separate internal passageways 1, 2, 3, 4 (see FIG. 3). Alternatively, the substrate body 100 may be attached to the cable 102 using an epoxy or other separate adherent as would be familiar to a person of ordinary skill in the art.

Figure 3:
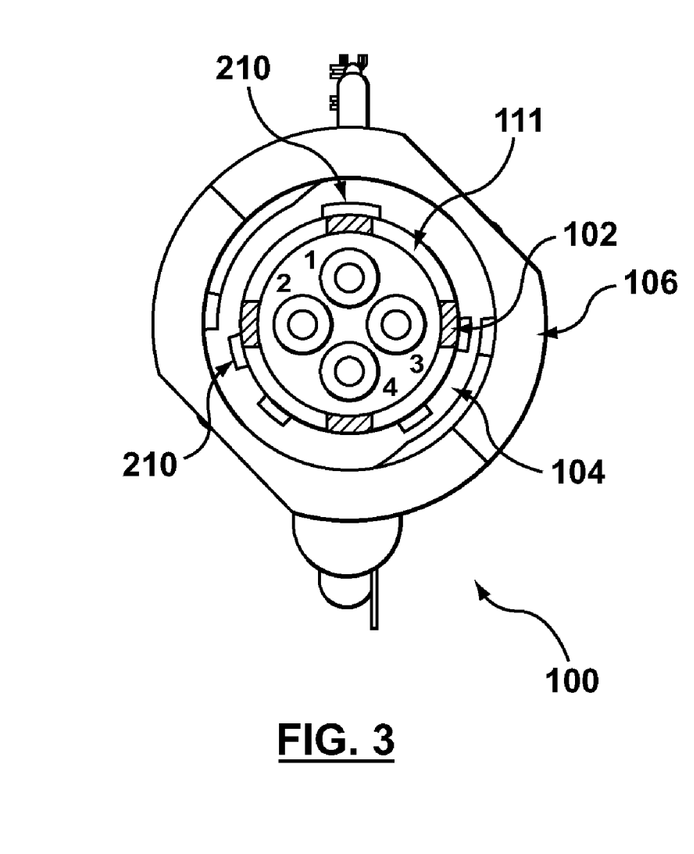
FIG. 3 is a front view of a the substrate body.

The pins may pass through the interior of the substrate body 100 towards the connecting end 120. The pins of the cable 102 may extend towards the connector end 120 to where the separate internal passageways 1, 2, 3, 4 become a single internal cavity. The connecting surface 111 may be in an internal cavity, for example, circumnavigating the internal passageways 1, 2, 3, 4. The four passageways 1, 2, 3, 4 may, for example, assist in aligning the pins of the cable 102 housed in the electronic connector 99 with the receiving ends of an electronic component of a cable that may be housed in the second connector which is itself connected to the electronic connector 99. It is recognized that there may be more or less than four pins/sockets extending from the cable 102 and at least as many passageways extending partially through the substrate body 100 to accommodate the pins.

A blocker 106 may extend outwardly from the exterior surface of the substrate body 100. The substrate body 100 may be threaded on a portion 104 of its exterior between the blocker 106 and the connecting end/surface 120. The threaded portion 104 allows the electronic connector 99 to securely attach to the second mating connector (e.g. a second CPC connector). For example, the second connector may have a mating threaded portion that screws onto the threaded portion 104 of the substrate body 100 so that the connecting surface 111 of the substrate body 100 is securely compressed against the connecting surface of the second connector (with the sealing gasket portion 302 positioned there between). The blocker 106 may delineate the threaded 104 portion of the substrate body 100 from the remainder of the substrate body 100. The blocker 106 may, for example, extend orthogonally and outwardly from the exterior surface of the substrate body 100 at the longitudinal location where the four separate internal passageways become the single internal cavity.

Figure 4:
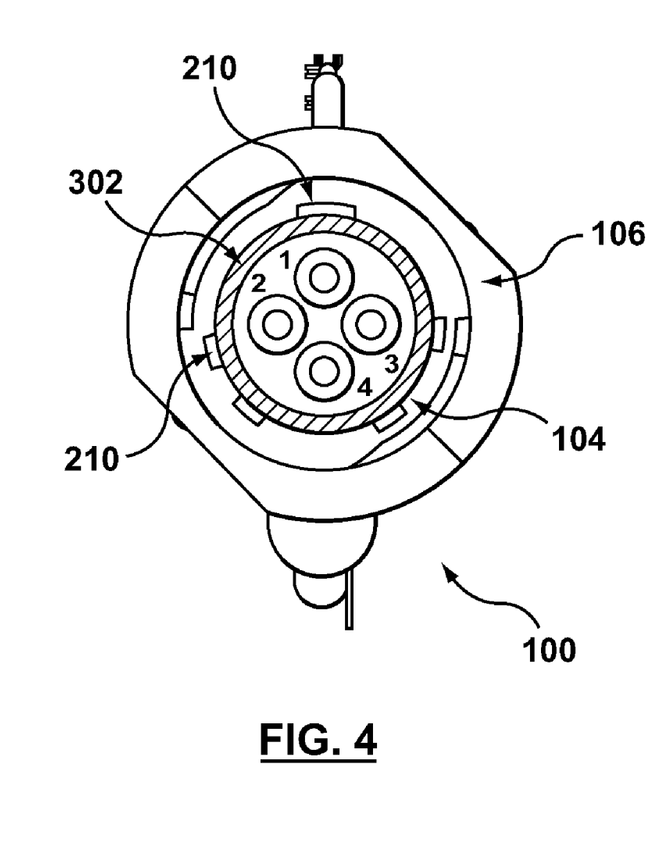
FIG. 4 is a front view of a the substrate body engaged with a second mold.

When the substrate body 100 is molded onto the cable 102 or formed to fit around the cable 102, as shown in FIG. 4, the four pins/sockets of the cable 102 may pass through the four holes 1, 2, 3, 4 in the blocker 106 so that they can connect to four mating receivers (e.g. sockets/pins) of the second connector. It is recognized that the cable 102 may comprise a different number of electronic pins as long as there are enough holes in the substrate body 100 to allow the required electronic pins to pass through.

There is at least one passage 202 (e.g. slit, slot, hole, tunnel, etc.) fluidly connecting the exterior surface of the substrate body 100 to the connecting surface 111 of the substrate body 100. For example, the blocker 106 may have four slits 202 defining openings in the blocker 106. The slits 202 each define fluid passageways between the exterior surface of the substrate body 100 (on the portion of the substrate body opposite the blocker 106 from the threaded portion 104) and the connecting surface 111 of the substrate body 100. The slits 202 may each, for example, partially circumnavigate the interior of the single internal cavity where the separate internal passageways 1, 2, 3, 4 meet the single internal cavity, which is the connecting surface 111.

Figure 5:
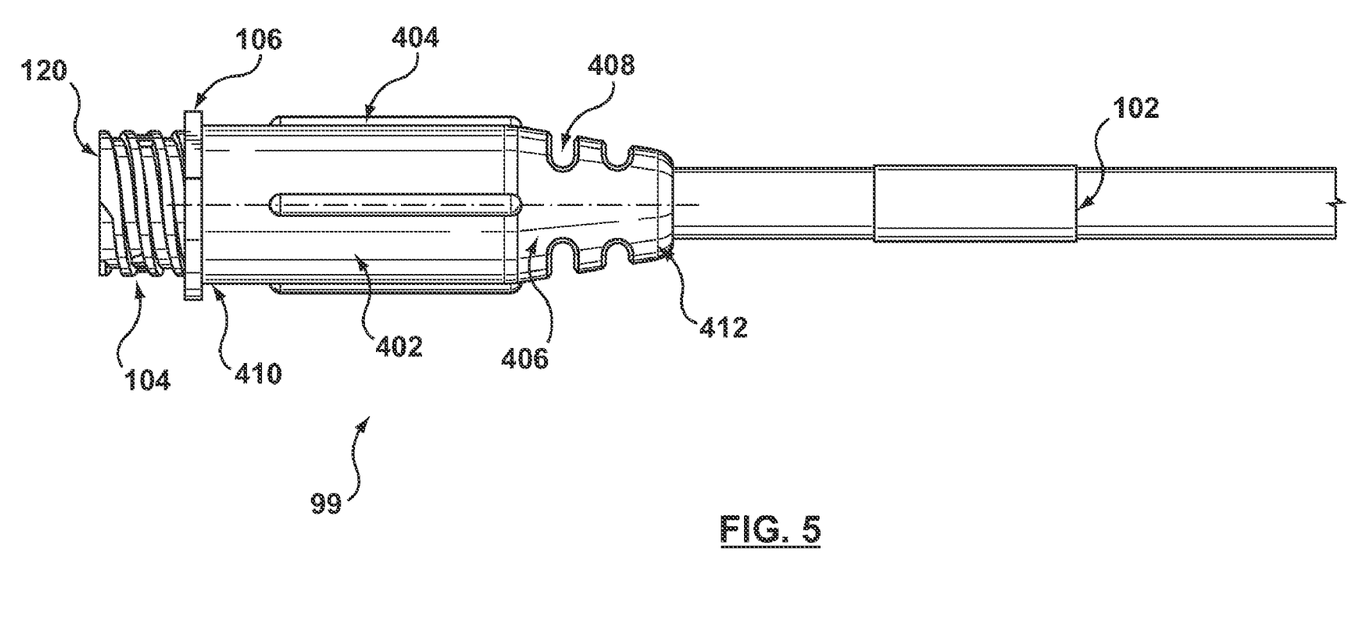
FIG. 5 is a side view of the overmold connector attached to a cable.

Referring to FIGS. 2, 4 and 5, a resilient material 402 may be moulded (e.g. overmoulded) onto the exterior surface 107 of the substrate body 100 so that the entire cable end 110 of the substrate body 100 is encapsulated between the moulded resilient material 402 and the cable 102. During the moulding process, a portion of the resilient material 402 fills and passes through the at least one passage 202 between the exterior surface 107 of the body 100 and the connecting surface 111 of the substrate body 100. Thus, the same resilient material 402 is moulded around the exterior surface 107 of the substrate body 100, within the at least one passageway 202 and on the connecting surface 111 of the substrate body 100. The portion of the resilient material that is on the connecting surface 111 forms the sealing gasket portion 302 when hardened.

The mold used in the moulding process may be shaped such that the portion of the resilient material 402 that is on the connecting surface 111 forms an annular ring (or other closed peripheral shaped seal) around the internal passageways 1, 2, 3, 4. The mold is further shaped so that the resilient material 402 that does pass onto the connecting/mating surface 111 forms the sealing gasket portion 302. The final moulded resilient material 402 is an integral element attached over a portion of the external surface 107 of the substrate body 100, having a portion passing through the passage 202 and having a portion attached to the interior of the substrate body 100 so as to form the sealing gasket portion 302. Thus, the moulded resilient material 402 forms a single continuous material element comprising the sealing gasket portion 302, an interconnecting portion, and the exterior body portion moulded onto the exterior surface 107 of the substrate body 100.

A substrate body 100 may first be molded onto the cable 102 using a first mold. The cable 102 may be connected to the substrate body 100 with a connection member 533 (see FIGS. 6A to 6F). The connection member 533 may be an epoxy, for example, or other adhesive material made using conventional molding processes. This substrate body 100 is then secured in a mold 502, as shown in FIGS. 6A to 6F. It is also recognised that the connection member 533 can also be a first overmould material that is formed before the resilient material 402 is formed over the substrate body 100 and the cable 102 attached via the overmoulded connection member 533. It is recognised that the connection member 533 is used as a stress/strain reliever between the cable 102 and the substrate body 100.

Figure 6A:
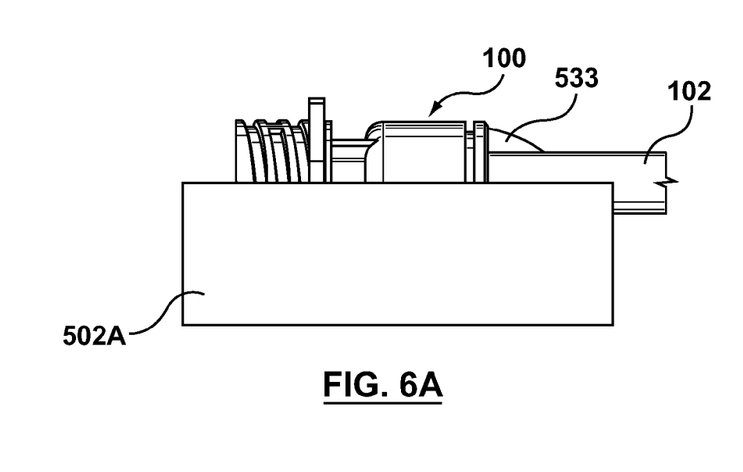
FIG. 6A is a side view of a substrate body in one part of a mold.
Figure 6B:
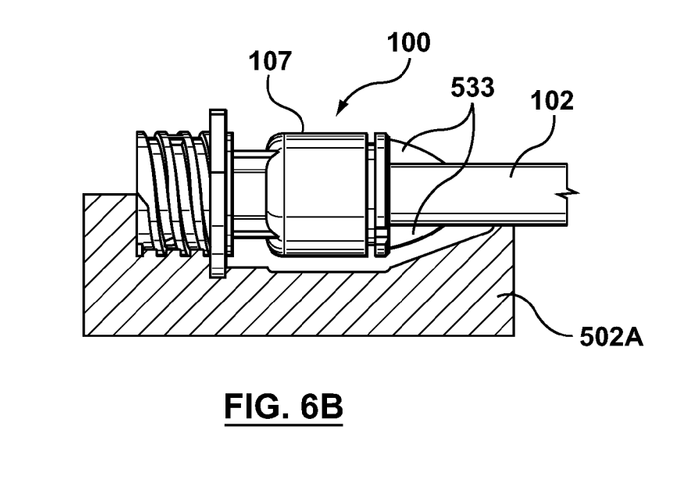
FIG. 6B is a cut-out view of a substrate body in one part of a mold.
Figure 6C:
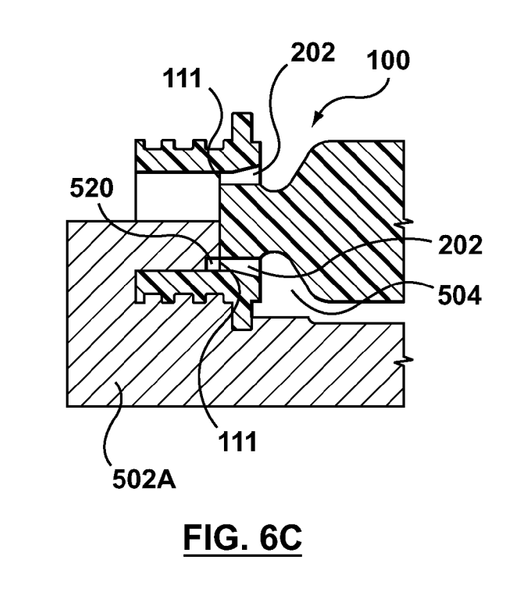
FIG. 6C is a cut-out sectional view of the connecting end of a substrate body in one part of a mold.

Referring to FIGS. 6A, B, C, the substrate body 100 with the cable 102 is placed in a first portion of the mould 502A. The first portion of the mould 502A is shaped to receive the substrate body 100 so that the threaded portion 104 of the substrate body 100 flushly abuts the mold 502A. The first portion of the mold 502A may be shaped so that a cavity 504 is formed around a portion of the substrate body 100 and cable 102 so that there is a space between the substrate body 100 and the first portion of the mold 502A. For example, the space may exist between the substrate body 100 and the mold 502A between the blocker 106 and the cable 102.

A second portion of the mold 502B (shown in FIGS. 6D and 6E) is secured over the top of the first portion of the mold 502A encapsulating the substrate body 100 and cable 102. The second portion of the mold 502B may have a space similar to the first portion of the mold 502A. The two spaces together may define a cavity 504 which completely surrounds (i.e. circumnavigates) a portion of the substrate body 100 and a portion of the cable 102. It is recognised that the cavity 504 is used top form the moulded resilient material 402 as a body portion 612, further described below, for covering at least part of the exterior surface 107 of the underlying substrate body 100.

Figure 6D:
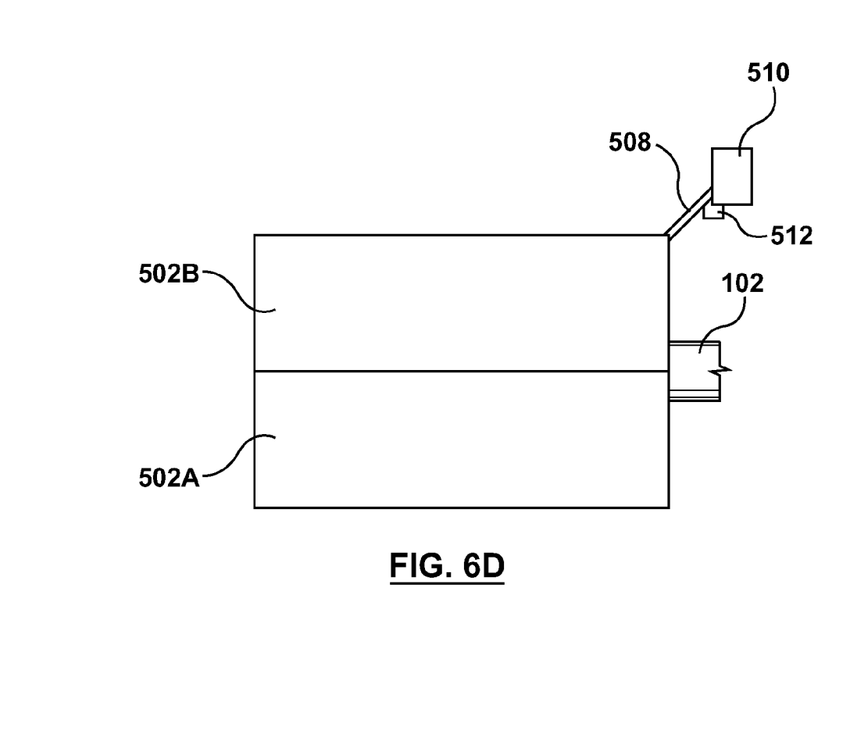
FIG. 6D is a mold for overmolding with a substrate body inside.
Figure 6E:
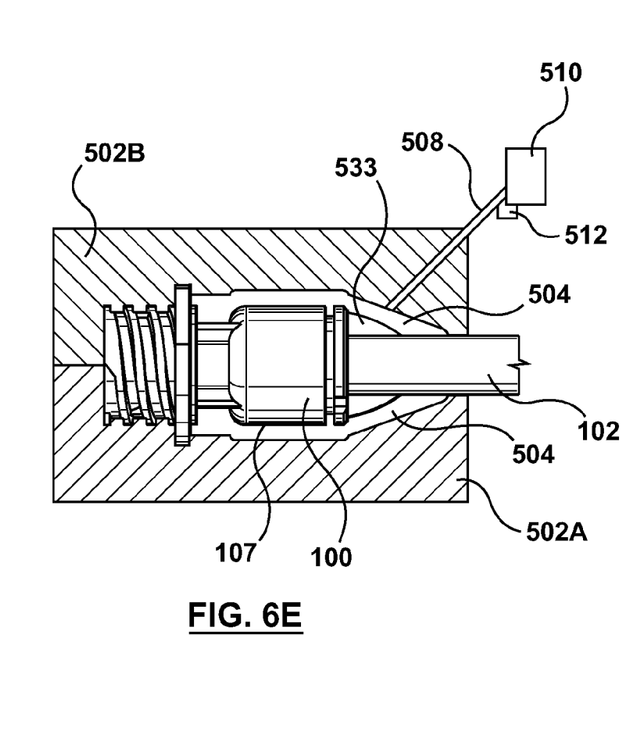
FIG. 6E is a cut-out view of a portion of a mold for overmolding with a substrate body inside.

A passage 508 (such as a hose or tube) passes through the second portion of the mold 502B between the cavity 504 and an injector 510. The injector 510 may be a conventional mold injector familiar to those of skill in the art. The mould injector 510 is for injecting the resilient material 402 into the cavity 504 so as to form the moulded portions as further described below. The resilient material 402 may be contained or stored, at least temporarily, in the injector 510. While contained in the injector 510, the resilient material 402 may be in the form of pellets suitable for injection or extrusion, for example.

The injector 510 and/or the passage 508 may be connected to a heat source 512. The heat source applies heat to the injector and/or the passage 508 so that the resilient material 402 becomes molten and fluid. The injector 510 then forces the molten resilient material 402 into the cavity 504 enclosed in the first mold portion 502A and the second mold portion 502B. The injector 510 thereby fills the cavity 504 with molten resilient material 402. It is recognized that a heat source 512 may be applied to the resilient material 402 prior to discharging the resilient material 402 into the injector 510 so that the resilient material 402 is in a fluid state (i.e. molten) before the resilient material 402 is discharged into the injector 510.

Figure 6F:
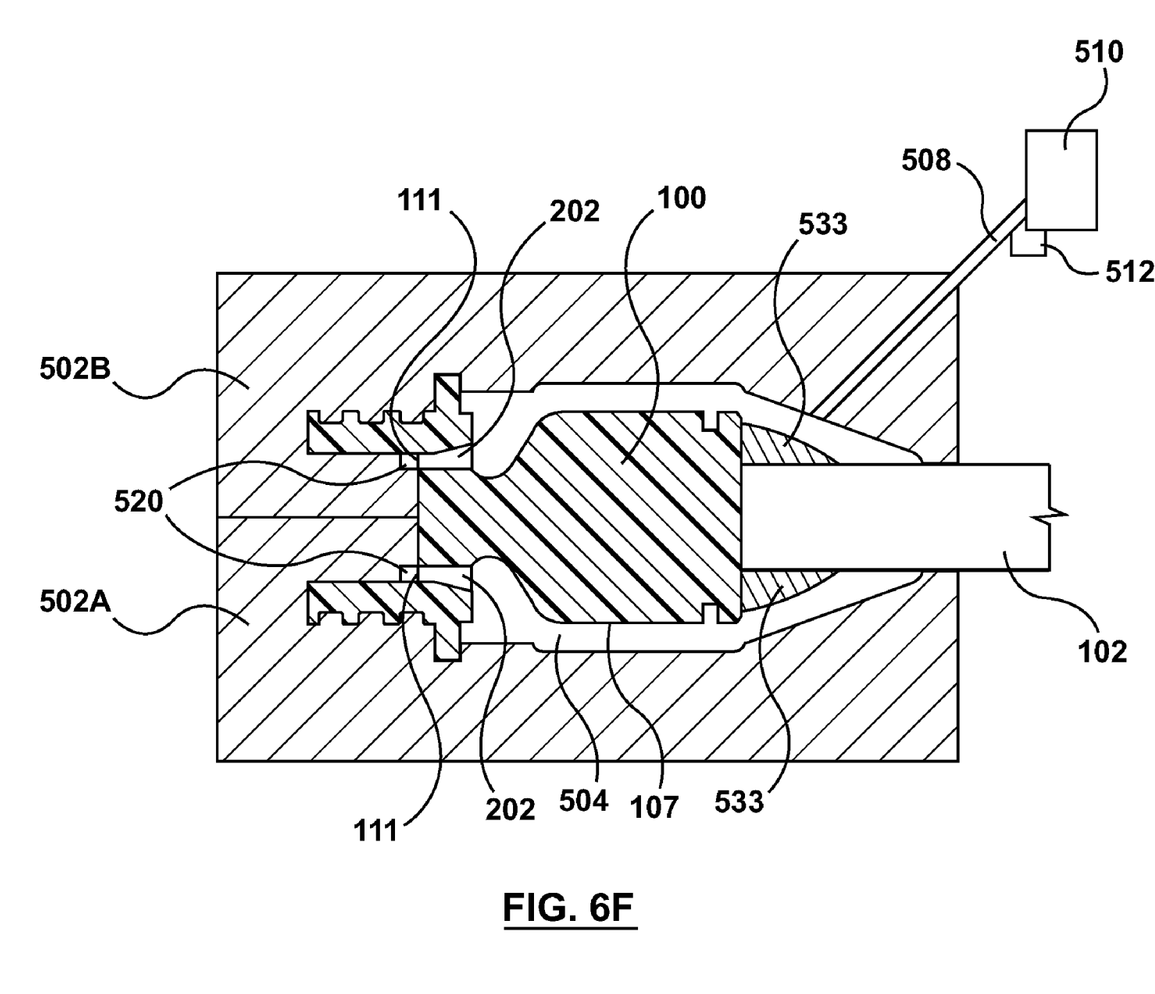
FIG. 6F is a cut-out view of a mold for overmolding with a substrate body inside.

Referring to FIG. 6C, the substrate body 100 fits into the first portion of the mold 502A so that the mold abuts the connecting surface 111 (e.g. is partially inside of the interior) of the substrate body 100 at the connector end 120. The second portion of the mold 502B similarly abuts the connecting surface 111 (e.g. partially inside of the interior) of the substrate body 110 at the connector end 120 (FIG. 6F). The two mold portions 502A, 502B together form a block on the connecting surface 111 of the substrate body 100 at the connector end 120 so as to block the fluid passage or slit 202 between the exterior surface 107 of the substrate body 100 and the connecting surface 111 of the substrate body 100. However, there is a notch/cavity 520 in each of the two molds portions 502A, 502B creating a space abutting the connecting surface 111 of the substrate body 100 which is fluidly connected to the passage or slit 202. Thus, when the injector 510 injects molten resilient material 402 into the cavity 504, the resilient material 402 will at least partially flow through the at least one slit 202 into the notch 520. This notch 520 is shaped so that the resilient material 402 formed on the connecting surface 111 of the substrate body 100 forms the sealing gasket portion 302 when the injected resilient material 402 is hardened/cured. The injector 510 thereby fills the cavity 504, the passageways 202, and the notches 520 with molten resilient material 402 for forming the respective portions (one of which is the sealing gasket portion 302) of the cured resilient material 402, as further described below.

Thus, during the moulding process the resilient material 402 flowing through the slits 202 in the blocker 106 may be shaped in the form of a ring (e.g. the sealing gasket portion 302) around the circumference of the single internal cavity of the substrate body 100 where the four separate internal passageways 1, 2, 3, 4 meet the single internal cavity. The sealing gasket portion 302 is for sealing the single internal cavity off from the ingress of fluids when the electronic connector 99 is connected to a second connector.

It is recognized that an adhesive material or bonding material may be placed onto the substrate body 100 prior to the overmolding process so as to provide that the resilient material 402 bonds to the substrate body 100 (e.g. on the exterior surface 107, in the passageways 202, and/or on the connecting surface 111). Alternatively, the resilient material 402 may itself form a direct bond (e.g. mechanically or chemically) to the substrate body 100 without the use of the intermediate adhesive inducing material.

The resilient material 402 can have a melting point lower than that of the first material so that the resilient material 402 may be heated into a molten state and moulded onto the substrate body 100 without the substrate body 100 melting or otherwise deforming appreciably. The resilient material 402 may be shaped and molded to provide grips 404 on its exterior surface. For example, the grips 404 may form longitudinal bumps along the exterior surface of the resilient material 402 so as to provide additional friction for a person gripping the electronic connector 99. The resilient material 402 may also be shaped to provide cut-outs 408 near its cable end 402. There may be a plurality of cut outs partially circumnavigating the resilient material 402 so as to provide a relatively flexible portion of the resilient material 402. These cut-outs 408 may also provide a stress relief for the portion of the cable 102 which connects to the substrate body 100 in conjunction with the moulded portion 533.

A second connector is configured to attach to the electronic connector 99. For example, the second connector may have a connecting end that mates with the connecting end 120 of the substrate body 100. For example there may be a threaded nut which screws onto the threaded 104 exterior of the connector. The second connector may have a connecting surface 111 which compresses against the connecting surface 111 of the substrate body 100. The moulded sealing gasket portion 302 may reside between the connecting surface of the second connector and the connecting surface 111 of the substrate body 100 thereby providing a seal when the two connecting surfaces 111 are compressed against each other (i.e. when the connectors are connected) with the gasket 302 therebetween. The electronic components (e.g. the pins) in the electronic connector 99 may be configured to connect to the electronic components (e.g. the sockets) of the second connector. The sealing gasket 302 may seal the perimeter of the area in which these electronic components are connected. The sealing gasket 302 thereby provides a seal against any elements (e.g. water, dirt) which could otherwise interfere with the electronic connection.

Coupling of Gasket 302 to Connecting Surface 111

Figure 6G:
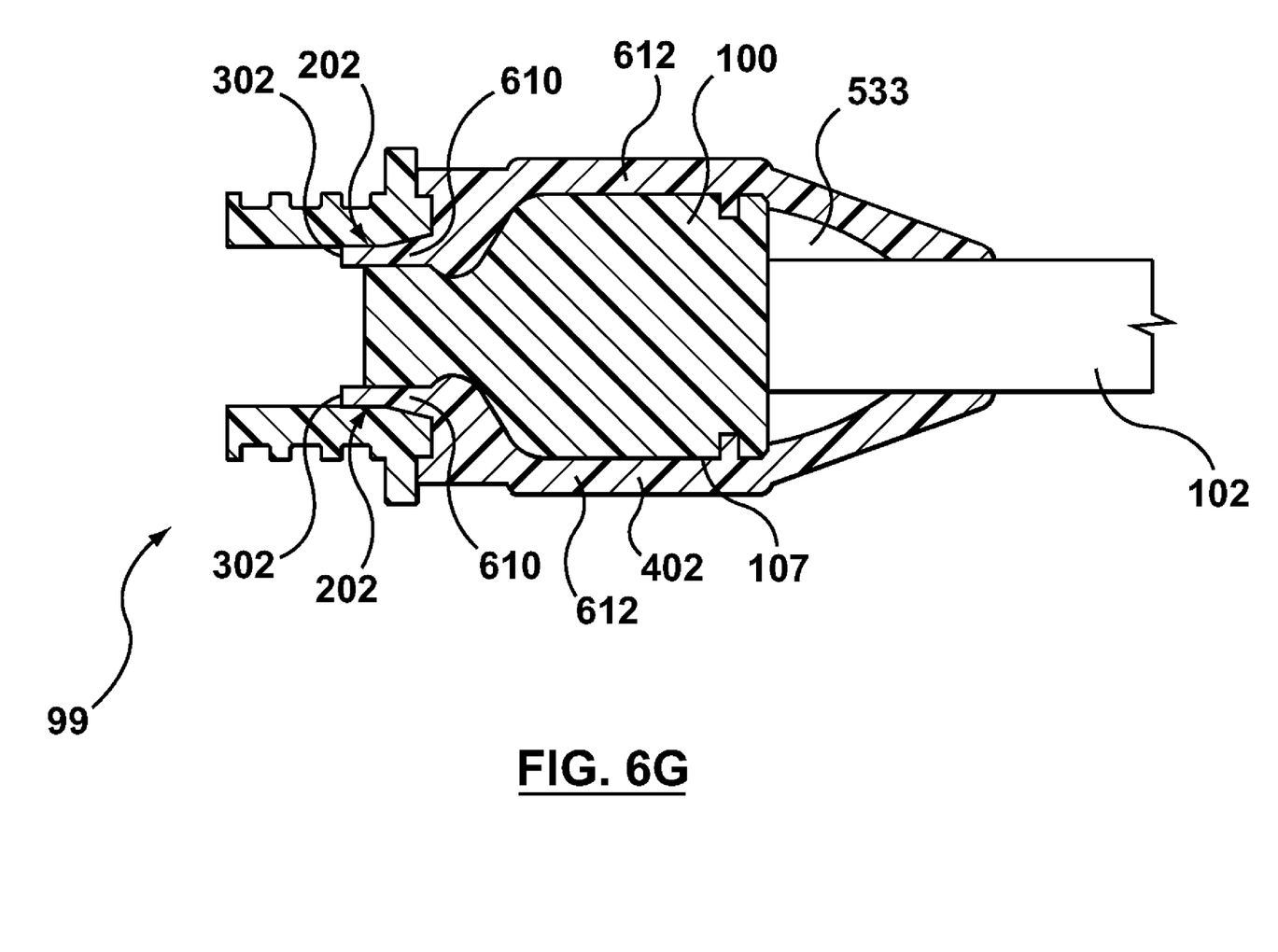
FIG. 6G is a cut-out view of a substrate body with a resilient material overmolded onto it.

FIG. 6G shows the substrate body 100 with the resilient material 402 moulded to it. The overmolded resilient material 402 forms a resilient body 612 on the exterior surface 107, a connecting portion 610 in the passageway(s) 202 and the sealing gasket portion 302 formed on the connecting surface 111. The sealing gasket portion 302 abuts the connecting surface 111. The sealing gasket 302 may be bonded to the connecting surface 111. Alternatively, the sealing gasket 302 may merely abut the connecting surface 111 without being bonded thereto.

The resilient body 612 is the portion of the resilient material 402 that is bonded to the exterior surface 107 of the substrate body 100. The connecting portion 610 is the portion of the resilient material that fills the passage or slit 202 between the exterior surface of the substrate body 100 and the connecting surface 111. This connecting portion 610 is integral with both the resilient body 612 and the sealing gasket portion 302.

In a further alternative, resilient material 402 is not be bonded to the connecting surface 111 but may be bonded to the remainder of the substrate body 100 to which it contacts. For example, if a separate adhesive is used to bond the resilient material 402 to the substrate body 100, the adhesive would not be placed onto the connecting surface 111. And if the resilient material 402 is directly bonded to the substrate body 100, then a different material can be used in the connecting surface 111 of the substrate body 100 so that the resilient material 402 does not bond to the connecting surface 111 but does bond to the remainder of the substrate body 100.

For example, the connecting surface 111 can be formed from a second material with the second material being different than the material that the external surface of the substrate body 100 is made from. This resilient material 402 may, for example, bond to the external surface of the substrate body 100 but may not bond to the second material which forms the connecting surface 111. Further, this separate connecting surface 111 piece may be molded to the substrate body 100 or may be otherwise attached to the substrate body 100 (e.g. snapped on). If the portion of the resilient material 402 which forms the gasket portion 302 is damaged, for example, then the gasket portion 302 portion of the resilient material 402 can be removed (e.g. broken off) from the overmold connecting portion(s) 610. A new, replacement separate gasket component could then, for example, be inserted into the connector. Alternatively, the resilient material 402 can be bonded to the substrate of the connecting surface 111, which may configure the connector 99 as a throw away part in the event of damage occurring to the formed sealing gasket 302 during use of the connector 99.

Method of Manufacturing the Electronic Connector 99

Figure 7:
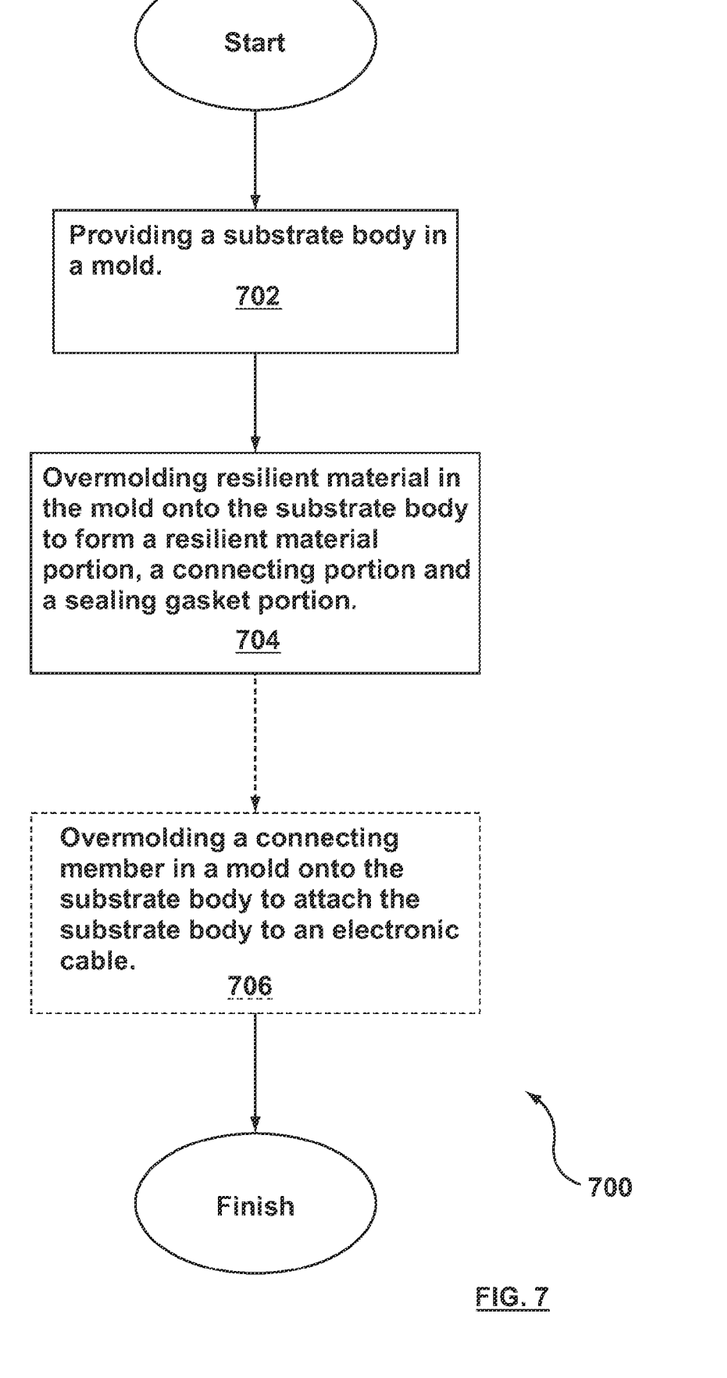
FIG. 7 is a flow chart showing the method of manufacturing the overmold connector.

FIG. 7 is a flow chart 700 showing a method of manufacturing the electronic connector 99. At step 702, the substrate body 100 is provided in the mold. The substrate body 100 may be a hard plastic, for example. The substrate body 100 may have itself been formed using mold and/or plastic extrusion. At step 704, the resilient material 402 is moulded (e.g. overmoulded) in the mould onto the substrate body 100 to form a resilient material body portion 402 on the external surface 107 of the substrate body 100 as a resilient body 612, a connecting portion 612 in the at least one passageway 202 and a sealing gasket portion 302 on the connecting surface, such that the sealing gasket portion 302 is integral with the connecting portion 610 and with the resilient body 612.

The substrate body 100 has at least one passage 202 between its exterior surface 107 and its interior connecting surface 111. This at least one passage 202 allows the resilient material 402 to pass therethrough. The passage may be a slit 202 as described above, for example. Thus the sealing gasket portion 302, the connecting portion 610 and the resilient body 612 are all formed in the overmolding process out of the same resilient material 402 as a continuous material once hardened/cured.

Optionally, at step 706, a connecting member 533 may be moulded in a mold onto the substrate body 100 in order to attach the substrate body 100 to the electronic cable 102. The connecting member 533 may be an overmould material that is different from the resilient material 402. The connecting member 533 can aid in the stress relief on the electronic cable 102.

The resilient material 402 can have a melting point lower than that of the substrate body 100. This can provide for the resilient material 402 to be overmoulded onto the substrate body 100 without appreciably melting the substrate body 100.

One or more currently preferred embodiments have been described by way of example. It will be apparent to persons skilled in the art that a number of variations and modifications can be made without departing from the scope of the invention as defined in the claims.

What is claimed is:

1. A connector, comprising:
   a substrate body having an exterior surface, a connecting surface at a connector end of the body for connecting to a second connector, and at least one passage in the body fluidly connecting the connecting surface and the exterior surface;
   a resilient material portion molded on the external surface of the substrate body as a resilient body portion, as a connecting portion in the at least one passageway, and as a sealing gasket portion on the connecting surface, such that the sealing gasket portion is integral with the connecting portion and with the resilient body wherein the melting point of the resilient material is lower than the melting point of the substrate body; and
   a connection member connected to the substrate body and connected to an electronic cable for securing the substrate body to the electronic cable, wherein the connection member is an overmould material different from the resilient material.

2. The connector of claim 1 wherein the connection member is molded onto at least one of the substrate body and the electronic cable.

3. The connector of claim 1, the resilient body having at least one exterior grip.

4. The connector of claim 1, the substrate body having a cable end opposite the connector end, the resilient body comprising cut-outs so as to provide a relatively flexible portion of the resilient body proximal the cable end of the substrate body.

5. The connector of claim 1, wherein the resilient body portion is bonded to the exterior surface of the substrate body.

6. The connector of claim 5, wherein the sealing gasket portion is bonded to the connecting surface.

7. The connector of claim 5, wherein the connecting surface is formed from a second material, the second material being a different material from that of the external surface of the substrate body.

8. The connector of claim 7, wherein the resilient body portion is bonded to the external surface of the substrate body and the sealing gasket portion is held adjacent to the connecting surface by the connecting portion.

9. The connector of claim 8, wherein the sealing gasket portion is bonded to the second material.

10. The connector of claim 1, the substrate body further having an interior for housing an electronic cable with associated electronic connectors.

11. The connector of claim 1, wherein the connecting surface is positioned on a female type connector configured for mating with a corresponding connecting surface of a male type connector.

12. The connector of claim 1, wherein the connecting surface is positioned on a male type connector configured for mating with a corresponding connecting surface of a female type connector.

13. A method of making a connector, comprising:
    providing a substrate body in a mould, the substrate body having an exterior surface, a connecting surface at a connector end of the body for connecting to a second connector, and at least one passage in the body fluidly connecting the connecting surface and the exterior surface;
    moulding resilient material in the mold onto the substrate body to form a resilient material portion on the external surface of the substrate body as a resilient body portion, a connecting portion in the at least one passageway and a sealing gasket portion on the connecting surface, such that the sealing gasket portion is integral with the connecting portion and with the resilient body portion; and
    overmolding a connecting member in a mold onto the substrate body to attach the substrate body to an electronic cable, wherein the connecting member is an overmold material different from the resilient material.

14. The method of making the connector of claim 13, wherein the step of overmolding a connecting member in a mold onto the substrate body is preformed prior to the step of overmolding resilient material in the mold onto the substrate body.

15. The method of making the connector of claim 13, wherein the melting point of the resilient material is lower than that of the first material.

16. The method of making the connector of claim 15, further comprising bonding the resilient material to the connecting surface of the substrate body.

17. The method of making the connector of claim 13, further comprising bonding the resilient material to the external surface of the substrate body.

18. An electronic connector, comprising:
    an electronic cable;
    a substrate body having an interior for housing the electronic cable and an exterior surface, a connecting surface at a connector end of the body for connecting to a second connector, and at least one passage in the body fluidly connecting the connecting surface and the exterior surface;
    a resilient material portion moulded on the external surface of the substrate body as a resilient body portion, as a connecting portion in the at least one passageway, and as a sealing gasket portion on the connecting surface, such that the sealing gasket portion is integral with the connecting portion and with the resilient body; and
    a connection member connected to the substrate body and connected to an electronic cable for securing the substrate body to the electronic cable, wherein the connection member is an overmould material different from the resilient material.

* * * * *